(12) United States Patent
Wade

(10) Patent No.: US 6,298,182 B1
(45) Date of Patent: Oct. 2, 2001

(54) WAVELENGTH DIVISION MULTIPLEXING/ DEMULTIPLEXING DEVICES USING POLYMER LENSES

(75) Inventor: Robert K. Wade, Stratham, NH (US)

(73) Assignee: Light Chip, Inc., Salem, NH (US)

( * ) Notice: Subject to any disclaimer, the term of this patent is extended or adjusted under 35 U.S.C. 154(b) by 0 days.

(21) Appl. No.: 09/392,670

(22) Filed: Sep. 8, 1999

Related U.S. Application Data

(63) Continuation-in-part of application No. 08/990,197, filed on Dec. 13, 1997, now Pat. No. 6,011,884, and a continuation of application No. 08/990,199, filed on Dec. 13, 1997, now Pat. No. 5,999,672.

(51) Int. Cl.$^7$ .................................................. G02B 6/293
(52) U.S. Cl. ................................ 385/24; 385/33; 385/37; 359/130
(58) Field of Search .................................. 264/2.6, 1.38; 385/93, 24, 33, 37, 132; 359/130

(56) References Cited

U.S. PATENT DOCUMENTS

| | | |
|---|---|---|
| 4,111,524 | 9/1978 | Tomlinson, III ................ 350/96.19 |
| 4,153,330 | 5/1979 | Tomlinson, III ................ 350/96.17 |
| 4,166,088 * | 8/1979 | Neefe ........................................ 264/1 |
| 4,198,117 * | 4/1980 | Kobayashi ............................. 385/37 |
| 4,274,706 | 6/1981 | Tangonan .......................... 350/96.19 |
| 4,279,464 | 7/1981 | Colombini ........................ 350/96.19 |

(List continued on next page.)

FOREIGN PATENT DOCUMENTS

| | | |
|---|---|---|
| 62-154684 | 7/1987 | (JP) . |
| WO 91 00535 | 1/1991 | (WO) . |
| WO 98 44374 | 10/1998 | (WO) . |
| WO 99 31532 | 6/1999 | (WO) . |

OTHER PUBLICATIONS

G. R. Harrison, Ph.D., Sc.D. et al., Practical Spectroscopy, Chapter 4—Diffraction–Grating Spectrographs, Prentice–Hall (1948).
W. J. Tomlinson, Wavelength multiplexing in multimode optical fibers, Applied Optics, vol. 16, No. 8 (Aug. 1977).
W. J. Tomlinson et al., Optical multiplexer for multimode fiber transmission systems, Appl. Phys. Lett., vol. 31, No. 3 (Aug. 1977).
W. J. Tomlinson et al., Optical wavelength–division multiplexer for the 1–1.4 μm spectral region, Electronics Letters, vol. 14, No. 11 (May 25, 1973).
T. Miki et al., Viabilities of the wavelength–division–multiplexing transmission system over an optical fiber cable, IEEE Transactions on Communications, vol. Com–26, No. 7 (Jul. 1978).
K. Aoyama et al., Optical demultiplexer for a wavelength division multiplexing system, Applied Optics, vol. 18, No. 8 (Apr. 15, 1979).

(List continued on next page.)

Primary Examiner—John D. Lee
Assistant Examiner—Ellen Kim
(74) Attorney, Agent, or Firm—Hunton & Williams

(57) ABSTRACT

An improved wavelength division multiplexing device is disclosed. The improved wavelength division multiplexing device has a diffraction grating for combining a plurality of monochromatic optical beams into a multiplexed, polychromatic optical beam. The improvement in the improved wavelength division multiplexing device is the use of a polymer collimating/focusing lens for collimating the plurality of monochromatic optical beams traveling along a first direction to the diffraction grating, and for focusing the multiplexed, polychromatic optical beam traveling along a second direction from the diffraction grating, wherein the second direction being substantially opposite the first direction.

12 Claims, 11 Drawing Sheets

U.S. PATENT DOCUMENTS

| | | | |
|---|---|---|---|
| 4,299,488 | 11/1981 | Tomlinson, III | 356/328 |
| 4,343,532 | 8/1982 | Palmer | 350/96.19 |
| 4,387,955 | 6/1983 | Ludman et al. | 350/96.19 |
| 4,449,782 * | 5/1984 | Korth | 385/37 |
| 4,479,697 | 10/1984 | Kapany et al. | 350/96.18 |
| 4,522,462 | 6/1985 | Large et al. | 350/96.19 |
| 4,583,820 | 4/1986 | Flamand et al. | 350/96.19 |
| 4,622,662 | 11/1986 | Laude et al. | 370/3 |
| 4,626,069 | 12/1986 | Dammann et al. | 350/162.2 |
| 4,634,215 | 1/1987 | Reule | 350/96.16 |
| 4,643,519 | 2/1987 | Bussard et al. | 350/96.19 |
| 4,652,080 | 3/1987 | Carter et al. | 350/96.19 |
| 4,671,607 | 6/1987 | Laude | 350/96.15 |
| 4,703,472 | 10/1987 | Blumentritt et al. | 370/3 |
| 4,707,056 | 11/1987 | Bittner | 350/96.12 |
| 4,708,425 | 11/1987 | Gouali et al. | 350/96.16 |
| 4,723,829 * | 2/1988 | Koonen | 385/37 |
| 4,726,645 | 2/1988 | Yamashita et al. | 350/96.18 |
| 4,736,360 * | 4/1988 | McMahon | 359/130 |
| 4,740,951 | 4/1988 | Lizet et al. | 370/3 |
| 4,741,588 | 5/1988 | Nicia et al. | 350/96.19 |
| 4,744,618 | 5/1988 | Mahlein | 350/96.19 |
| 4,746,186 | 5/1988 | Nicia | 350/96.13 |
| 4,748,614 | 5/1988 | Dammann et al. | 370/3 |
| 4,749,247 | 6/1988 | Large | 350/96.16 |
| 4,752,108 | 6/1988 | Vollmer | 350/96.12 |
| 4,760,569 | 7/1988 | Mahlein | 350/3 |
| 4,763,969 | 8/1988 | Khoe et al. | 350/96.19 |
| 4,773,063 | 9/1988 | Hunsperger et al. | 370/3 |
| 4,784,935 | 11/1988 | Ehrfeld et al. | 430/321 |
| 4,786,133 | 11/1988 | Gidon et al. | 350/96.19 |
| 4,819,224 | 4/1989 | Laude | 370/3 |
| 4,834,485 | 5/1989 | Lee | 350/96.19 |
| 4,836,634 | 6/1989 | Laude | 350/96.19 |
| 4,857,726 | 8/1989 | Kinney et al. | 250/226 |
| 4,923,271 | 5/1990 | Henry et al. | 350/96.19 |
| 4,926,412 | 5/1990 | Jannson et al. | 370/3 |
| 4,930,855 | 6/1990 | Clark et al. | 350/96.19 |
| 4,934,784 | 6/1990 | Kapany et al. | 350/96.18 |
| 5,026,131 | 6/1991 | Jannson et al. | 350/3.7 |
| 5,107,359 | 4/1992 | Ohuchida | 359/124 |
| 5,170,451 | 12/1992 | Ohshima | 385/43 |
| 5,228,103 | 7/1993 | Chen et al. | 385/14 |
| 5,278,687 | 1/1994 | Jannson et al | 359/125 |
| 5,355,237 | 10/1994 | Lang et al. | 359/130 |
| 5,363,220 | 11/1994 | Kuwayama et al. | 359/3 |
| 5,440,416 | 8/1995 | Cohen et al. | 359/127 |
| 5,442,472 | 8/1995 | Skrobko | 359/110 |
| 5,450,510 | 9/1995 | Boord et al. | 385/37 |
| 5,457,573 | 10/1995 | Iida et al. | 359/569 |
| 5,500,910 | 3/1996 | Boudreau et al. | 385/24 |
| 5,513,289 | 4/1996 | Hosokawa et al. | 385/33 |
| 5,526,155 | 6/1996 | Knox et al. | 359/130 |
| 5,541,774 | 7/1996 | Blankenbecler | 359/653 |
| 5,555,334 | 9/1996 | Ohnishi et al. | 385/93 |
| 5,567,363 * | 10/1996 | Jung et al. | 264/2.6 |
| 5,583,683 | 12/1996 | Scobey | 359/127 |
| 5,606,434 | 2/1997 | Feldman et al. | 359/3 |
| 5,657,406 | 8/1997 | Ball | 385/24 |
| 5,703,722 | 12/1997 | Blankenbecler | 359/653 |
| 5,742,416 | 4/1998 | Mizrahi | 359/134 |
| 5,745,270 | 4/1998 | Koch | 359/124 |
| 5,745,271 | 4/1998 | Ford et al. | 359/130 |
| 5,745,612 | 4/1998 | Wang et al. | 385/24 |
| 5,748,350 | 5/1998 | Pan et al. | 359/130 |
| 5,748,815 | 5/1998 | Hamel et al. | 385/37 |
| 5,768,450 | 6/1998 | Bhagavatula | 385/24 |
| 5,777,763 | 7/1998 | Tomlinson, III | 359/130 |
| 5,917,625 * | 6/1999 | Ogusu et al. | 359/130 |
| 6,011,884 * | 1/2000 | Dueck et al. | 385/24 |

OTHER PUBLICATIONS

K. Aoyama et al., Low–loss optical demultiplexer for WDM systems in the 0.8–μm wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No. 3 (Jan. 31, 1980).

K. Kobayashi et al., Microoptic Grating Multiplexers and Optical Isolators for Fiber–Optic Communications, Journal of Quantum Electronics, vol. QE–16, No. 1 (Jan. 1980).

Yohji Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B. D. Metcalf et al., High–capacity wavelength demultiplexer with a large–diameter GRIN rod lens, Applied Optics, vol. 21, No. 5 (Mar. 1, 1982).

J. Lipson et al., Low–loss Wavelength Division Multiplexing (WDM) Devices for Single–Mode Systems, Journal of Lightwave Technology, vol LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. Lt–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle Gratings Used in Photonic Integrated Devices for WDM Applications, Journal of Lightwave Technology, vol. 12, No. 11 (Nov. 1994).

A. Stavdas et al., Design of a holographic concave grating used as a multiplexer/demulitplexer in dense wavelength-–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288, No date available.

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channel spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6um Band Using a Small Focusing Parameter Graded–Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2, (Jan. 22, 1981).

J. Laude et al., Wavelength division multiplexing/demultiplexing (WDM) using diffraction gratings, SPIE, vol. 503, Application, Theory, and Fabricationof Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices with Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with multiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical–Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

D. Wisely, 32 Channel WDM Multiplexer with 1nm Channel Spacing and 0.7nm Bandwidth, Electronics Letters, vol. 27, No. 6 (Mar. 14, 1991).

* cited by examiner

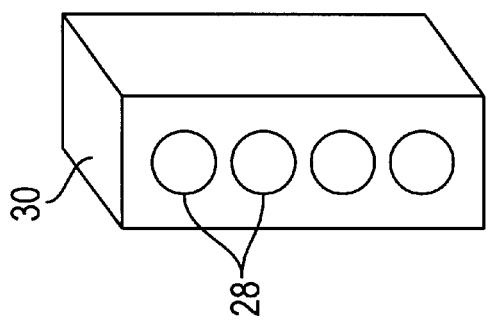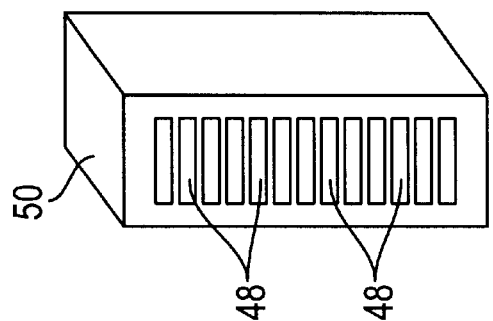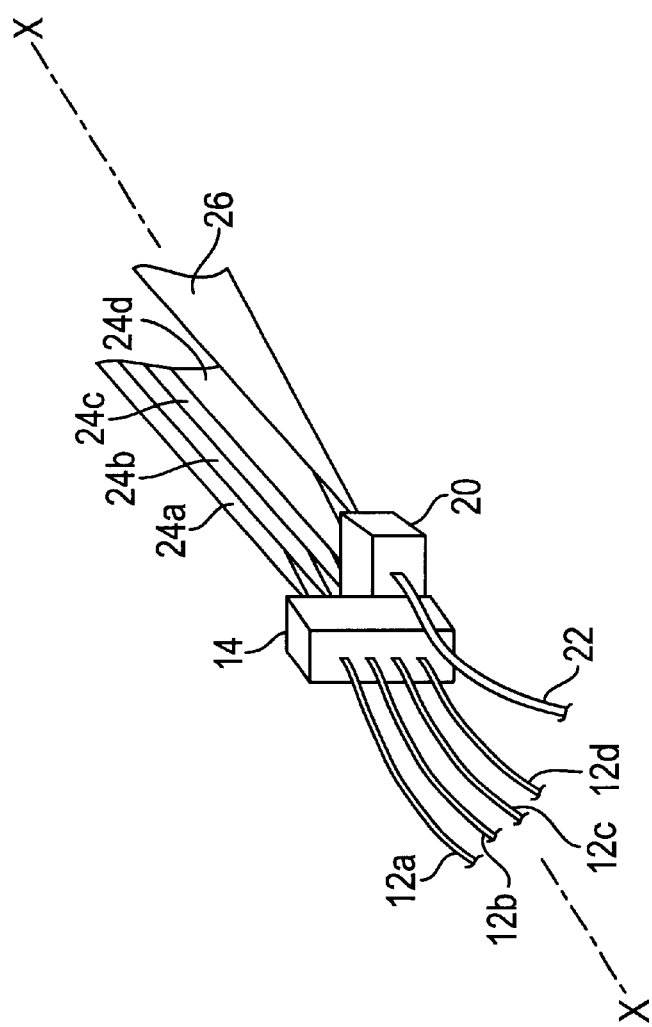

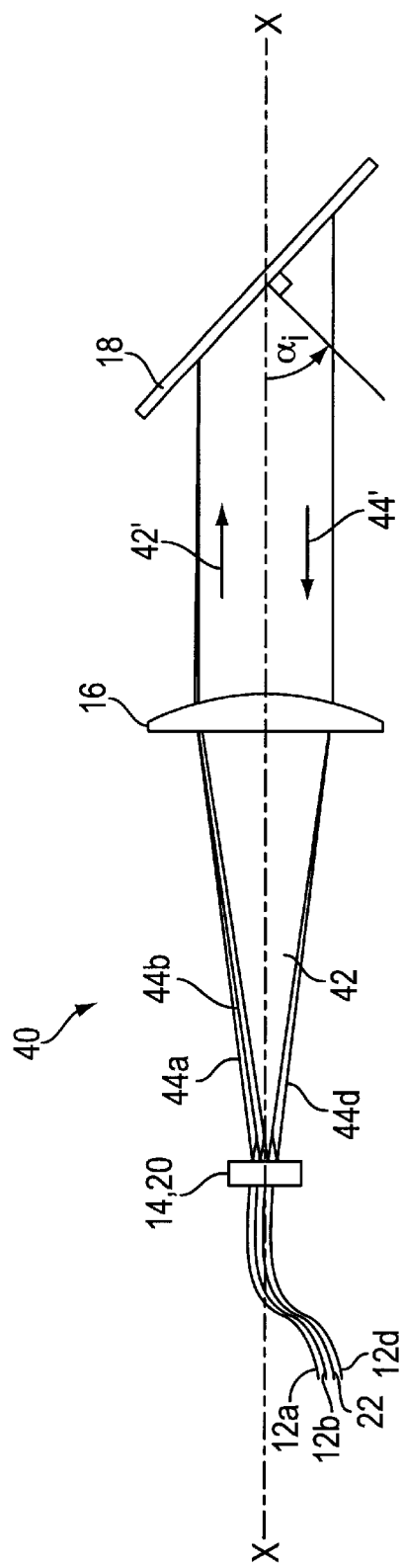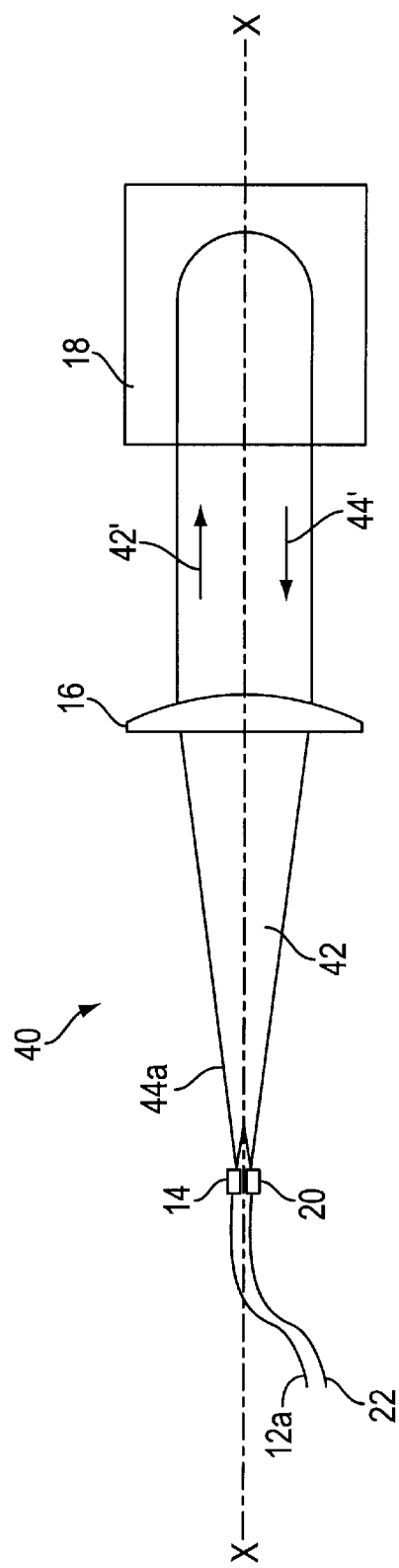

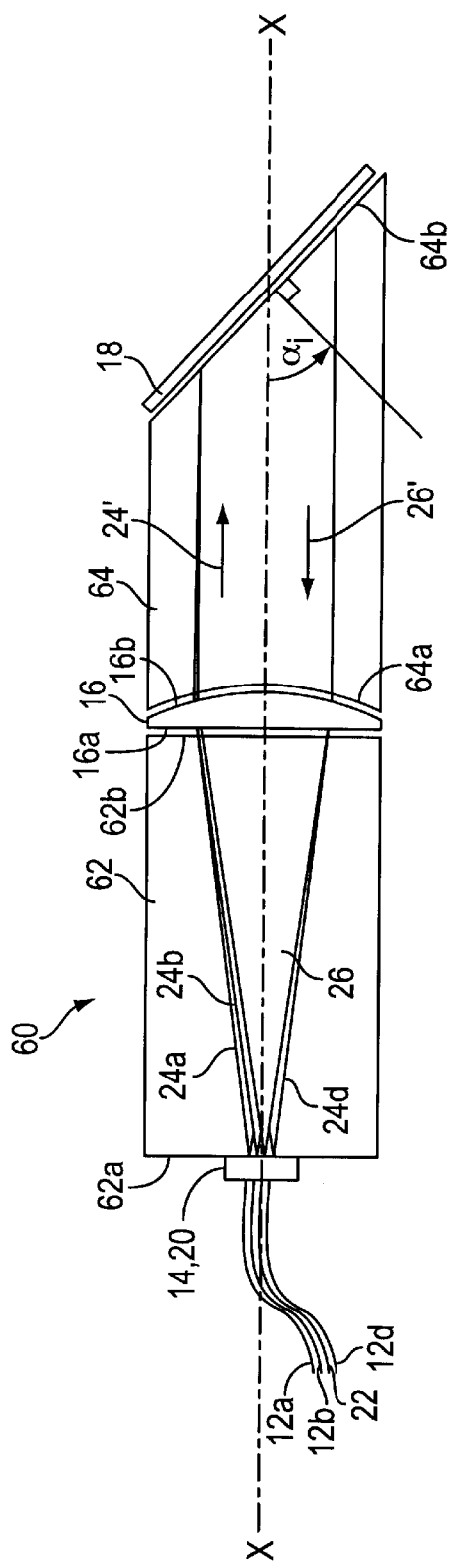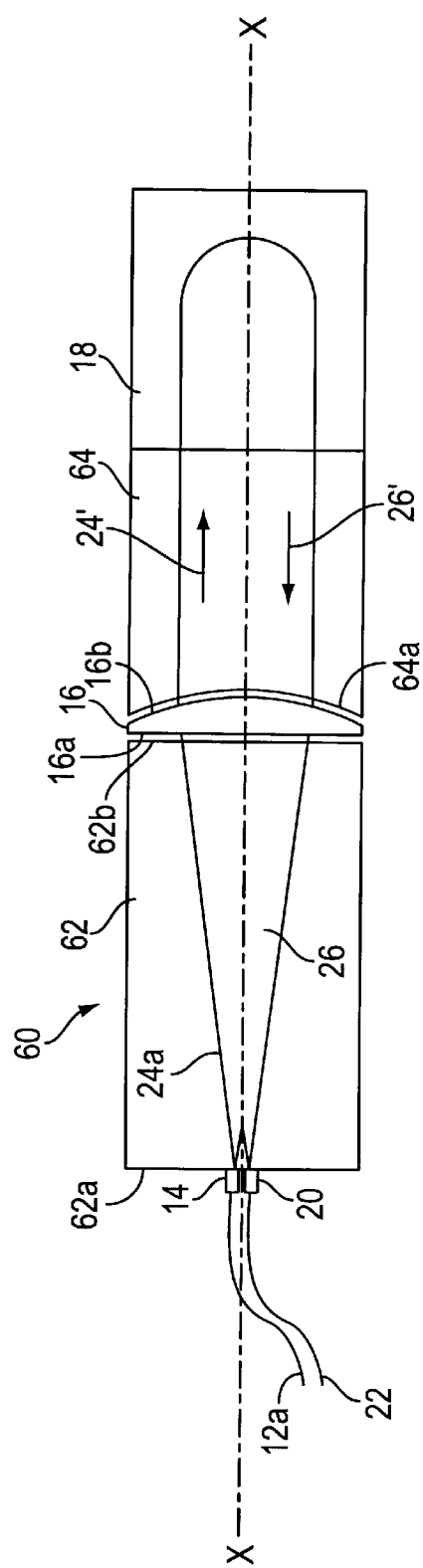

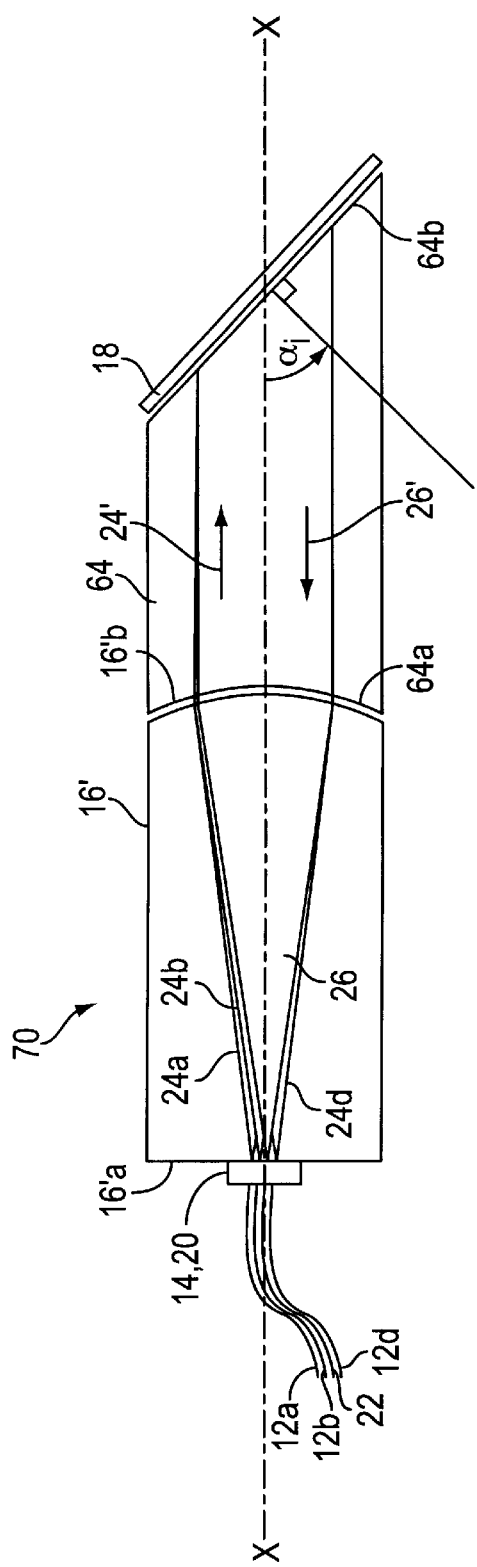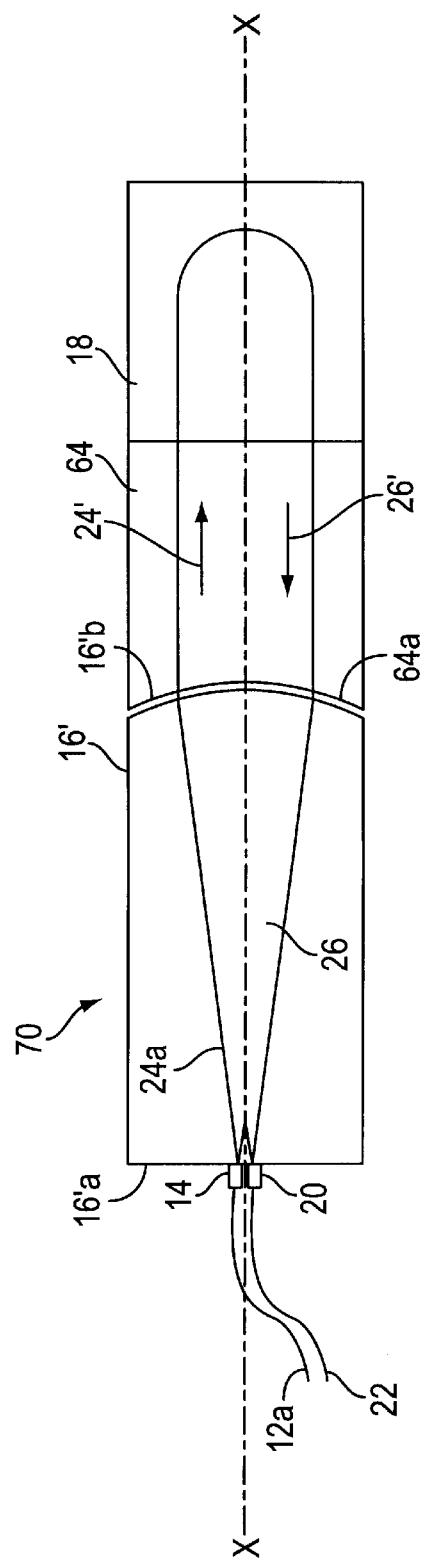

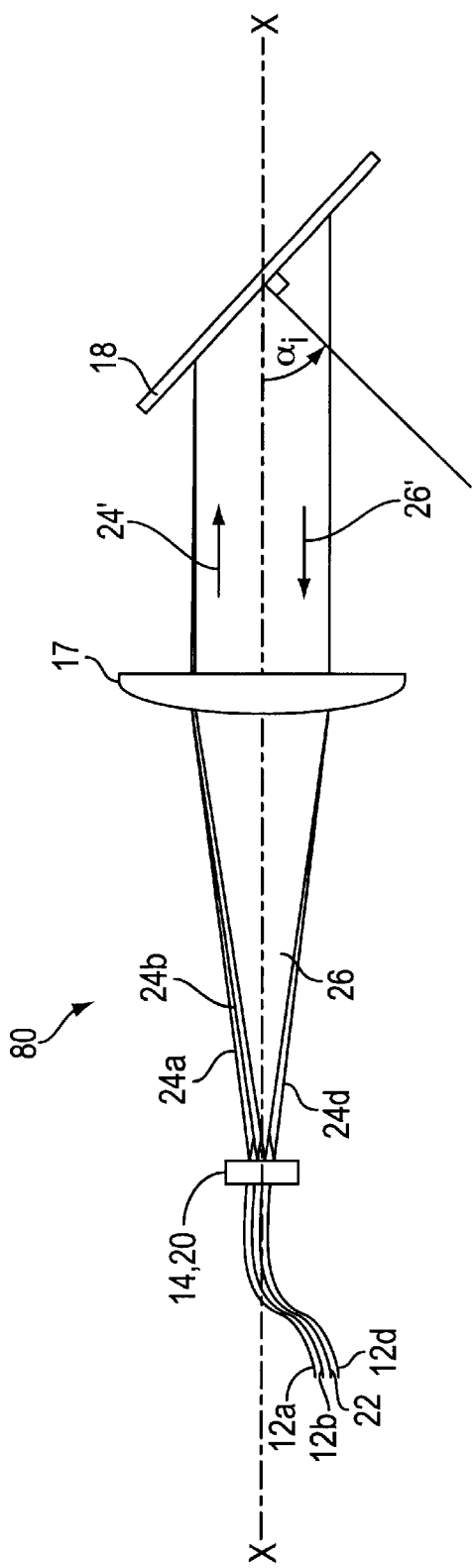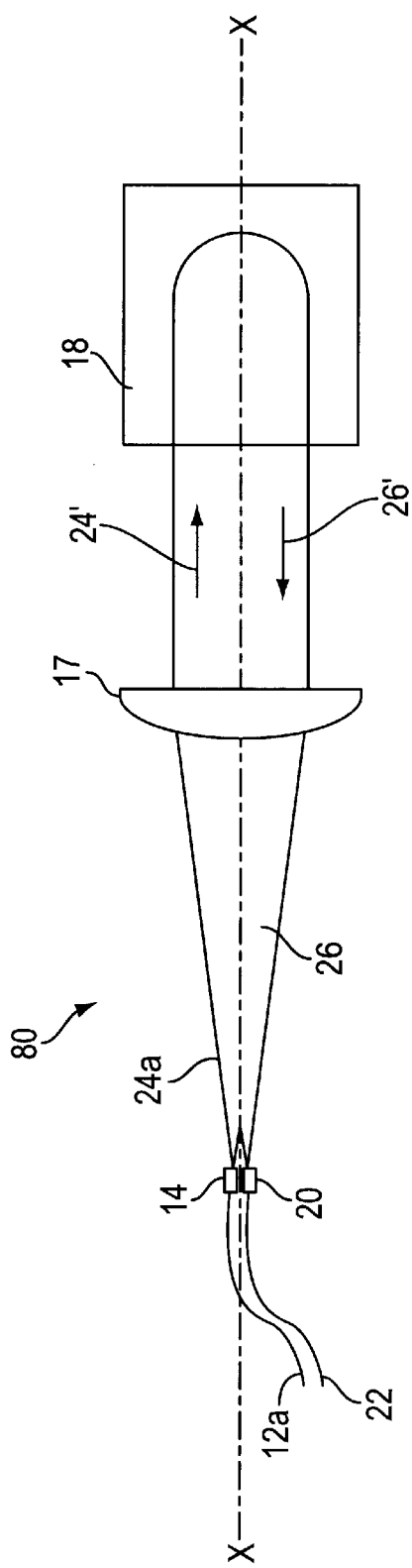

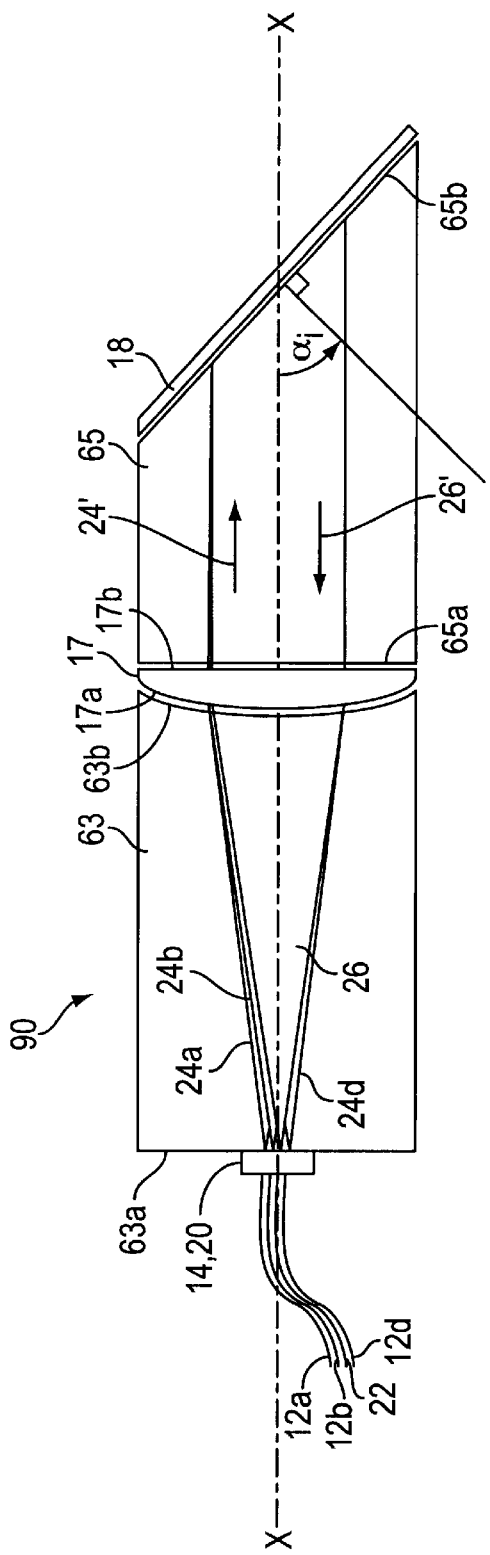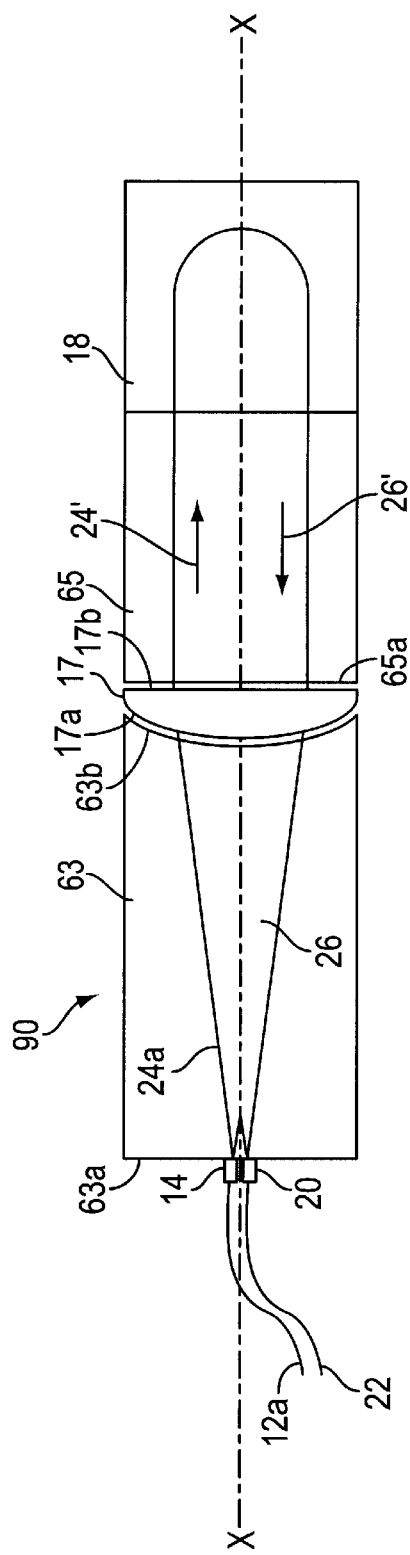
FIG. 7A
FIG. 7B

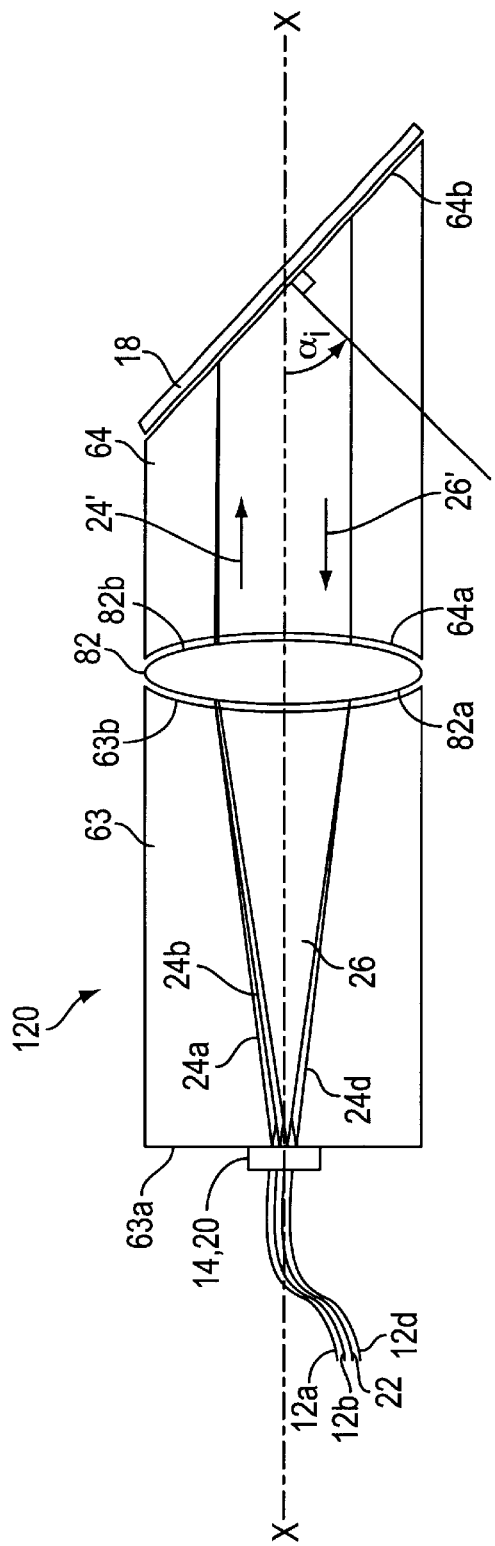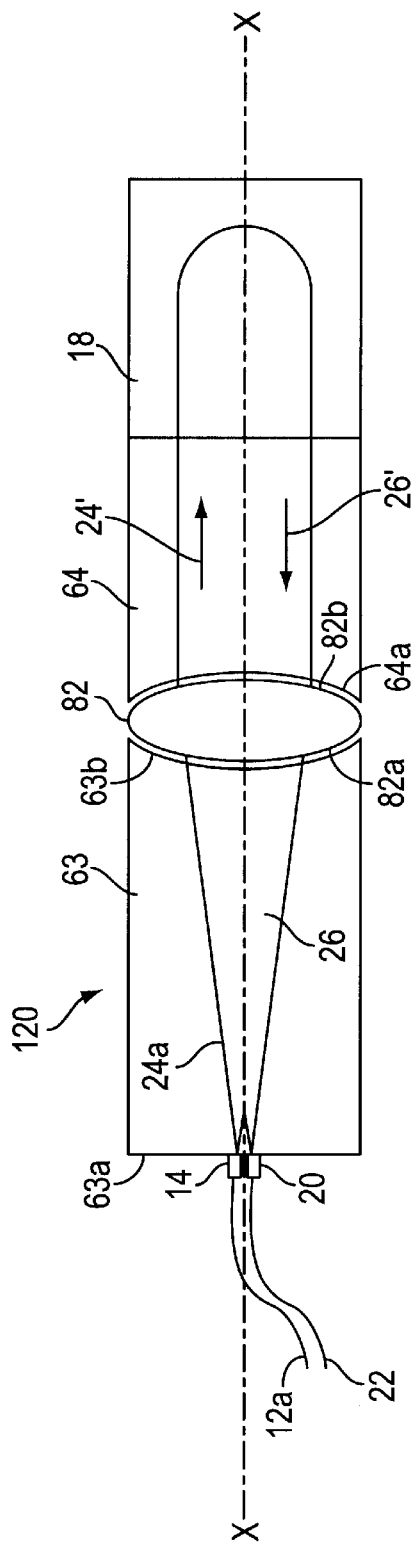

WAVELENGTH DIVISION MULTIPLEXING/DEMULTIPLEXING DEVICES USING POLYMER LENSES

CROSS-REFERENCE TO RELATED APPLICATIONS

This patent application is a continuation-in-part patent application of U.S. patent application Ser. No. 08/990,197, filed Dec. 13, 1997, now U.S. Pat. No. 6,011,884, and U.S. patent application Ser. No. 08/990,199, filed Dec. 13, 1997, now U.S. Pat. No. 5,999,672, both of which are hereby incorporated by reference herein in their entirety.

This patent application is related to U.S. patent application Ser. No. 09/392,831, now U.S. Pat. No. 6,181,853, filed concurrently herewith and hereby incorporated by reference herein in its entirety.

FIELD OF THE INVENTION

The present invention relates generally to wavelength division multiplexing/demultiplexing and, more particularly, to wavelength division multiplexing/demultiplexing devices using polymer lenses.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels in and out, respectively, of an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

During the past 20 years, various types of WDMs have been proposed and demonstrated. For example, (1) W. J. Tomlinson, *Applied Optics*, Vol. 16, No. 8, pp. 2180–2194 (August 1977); (2) A. C. Livanos et al., *Applied Physics Letters*, Vol. 30, No. 10, pp. 519–521 (May 15, 1977); (3) H. Ishio et al., *Journal of Lightwave Technology*, Vol 2, No. 4, pp. 448–463 (August 1984); (4) H. Obara et al., *Electronics Letters*, Vol. 28, No. 13, pp. 1268–1270 (Jun. 18, 1992); (5) A. E. Willner et al., *IEEE Photonics Technology Letters*, Vol. 5, No. 7, pp. 838–841 (July 1993); and (6) Y. T. Huang et al., *Optical Letters*, Vol. 17, No. 22, pp. 1629–1631 (Nov. 15, 1992), all disclose some form of WDM device and/or method. However, most of the devices and/or methods disclosed in the above-listed publications are classical optics-based WDM approaches which employ very basic lenses formed of standard optical glass materials that are adequate only for use with multimode optical fibers and are inadequate for use with single mode optical fibers because the core diameter of a single mode optical fiber (i.e., typically 8 $\mu$m) is much smaller than the core diameter of a multimode optical fiber (i.e., typically 62.5 $\mu$m). That is, due to the very basic lenses employed therein, WDM devices incorporating the principles set forth in the classical optics-based WDM approaches disclosed in the above-listed publications are unable to receive and transmit optical beams from and to single mode optical fibers, respectively, without incurring unacceptable amounts of insertion loss and channel crosstalk. These unacceptable levels of insertion loss and channel crosstalk are largely due to the inadequate imaging capabilities of these very basic lenses.

One proposed solution to the above-described optical imaging problem has been to add additional lenses formed of standard optical glass materials to WDM devices, thereby resulting in WDM devices having doublet, triplet, and even higher number lens configurations. By adding these additional lenses to WDM devices, wherein the added lenses typically have alternating high and low refraction indexes, aberrations caused mainly by the spherical nature of the lenses are effectively canceled out. However, an increased cost is associated with adding these additional lenses due to the direct cost of the additional lenses, as well as the indirect costs associated with the increased complexity and resulting decreased manufacturability of WDM devices having multiple lenses.

Another proposed solution to the above-described optical imaging problem has been to use gradient refractive index lenses (e.g., Gradium lenses) in WDM devices. The use of these gradient refractive index lenses results in a significant improvement in the quality of the imaging system within WDM devices. However, costs associated with manufacturing these gradient refractive index lenses is significantly greater than the costs associated with manufacturing standard homogeneous refractive index lenses, despite the fact that both are typically formed of standard optical glass materials.

In view of the foregoing, there remains a real need for a WDM device which possesses or allows for all the characteristics of: low cost, component integration, environmental and thermal stability, low channel crosstalk, low channel signal loss, ease of interfacing, large number of channels, and narrow channel spacing. Accordingly, it would be desirable to provide a WDM device which overcomes the above-described inadequacies and shortcomings, while possessing or allowing for all of the above-stated characteristics.

OBJECTS OF THE INVENTION

The primary object of the present invention is to provide wavelength division multiplexing/demultiplexing devices which use polymer lenses to achieve exceptional device performance, as well as reduced device cost, complexity, and manufacturing risk.

The above-stated primary object, as well as other objects, features, and advantages, of the present invention will become readily apparent from the following detailed description which is to be read in conjunction with the appended drawings.

SUMMARY OF THE INVENTION

According to the present invention, an improved wavelength division multiplexing device is provided. In a preferred embodiment, the improved wavelength division multiplexing device has a diffraction grating for combining a plurality of monochromatic optical beams into a multiplexed, polychromatic optical beam. The improvement in the improved wavelength division multiplexing device comes from the use of a polymer collimating/focusing lens for collimating the plurality of monochromatic optical beams traveling along a first direction to the diffraction grating, and for focusing the multiplexed, polychromatic optical beam traveling along a second direction from the diffraction grating. The second direction is substantially opposite the first direction. The diffraction grating is preferably a reflective diffraction grating oriented at the Littrow diffraction angle with respect to the first and second directions.

The polymer collimating/focusing lens is typically a plano-convex polymer collimating/focusing lens, or a bi-convex polymer collimating/focusing lens, although other lens configurations are possible. For example, the polymer collimating/focusing lens can be spherical or aspherical. Also, the polymer collimating/focusing preferably operates in the infrared (IR) region of the electromagnetic spectrum since this is the region where the power loss (attenuation) and dispersion of silica-based optical fibers is very low. Accordingly, the polymer collimating/focusing lens is typically formed of a polymer material selected from the group consisting of acrylic, styrene, polycarbonate, copolymers thereof, and other polymer materials that efficiently transmit optical beams in the infrared (IR) region of the electromagnetic spectrum.

In accordance with other aspects of the present invention the improvement in the improved wavelength division multiplexing device can be the use of a polymer collimating lens for collimating a plurality of monochromatic optical beams traveling along a first direction to the diffraction grating, and a polymer focusing lens for focusing a multiplexed, polychromatic optical beam traveling along a second direction from the diffraction grating. In this case, the second direction is different from, but not opposite, the first direction. Also, the diffraction grating is preferably a reflective diffraction grating, but not necessarily oriented at the Littrow diffraction angle with respect to the first and second directions.

In accordance with other aspects of the present invention, an integrated wavelength division multiplexing device can be provided. That is, an integrated wavelength division multiplexing device can be provided comprising a polymer collimating/focusing lens for collimating a plurality of monochromatic optical beams traveling along a first direction, and for focusing a multiplexed, polychromatic optical beam traveling along a second direction. In this case, the second direction is again substantially opposite the first direction.

The integrated wavelength division multiplexing device also comprises a first boot lens affixed to the polymer collimating/focusing lens for transmitting the plurality of monochromatic optical beams from the polymer collimating/focusing lens along the first direction, and for transmitting the multiplexed, polychromatic optical beam to the polymer collimating/focusing lens along the second direction. The first boot lens has a planar interface surface.

The integrated wavelength division multiplexing device further comprises a diffraction grating formed at the planar interface surface of the first boot lens for combining the plurality of monochromatic optical beams into the multiplexed, polychromatic optical beam, and for reflecting the multiplexed, polychromatic optical beam back into the first boot lens. The diffraction grating is preferably a reflective diffraction grating oriented at the Littrow diffraction angle with respect to the first and second directions.

In accordance with further aspects of the present invention, the first boot lens can be incorporated into the polymer collimating/focusing lens such that the polymer collimating/focusing lens has the planar interface surface at which the diffraction grating is formed.

In accordance with still further aspects of the present invention, the polymer collimating/focusing lens can have a planar interface surface for accepting the plurality of monochromatic optical beams from at least one optical source (e.g., optical fibers, laser diodes), and for outputting the multiplexed, polychromatic optical beam to at least one optical receiver (e.g., optical fibers, photodetectors).

In accordance with still further aspects of the present invention, the integrated wavelength division multiplexing device further comprises a second boot lens affixed to the polymer collimating/focusing lens for transmitting the plurality of monochromatic optical beams to the polymer collimating/focusing lens along the first direction, and for transmitting the multiplexed, polychromatic optical beam from the polymer collimating/focusing lens along the second direction. The second boot lens preferably has a planar interface surface for accepting the plurality of monochromatic optical beams from at least one optical source, and for outputting the multiplexed, polychromatic optical beam to at least one optical receiver.

In accordance with other aspects of the present invention, a wavelength division multiplexing device can be provided. That is, a wavelength division multiplexing device can be provided comprising a polymer collimating lens for collimating a plurality of monochromatic optical beams, and a diffraction grating for combining the plurality of collimated, monochromatic optical beams into a multiplexed, polychromatic optical beam, and for reflecting the multiplexed, polychromatic optical beam. The wavelength division multiplexing device also comprises a polymer focusing lens for focusing the reflected, multiplexed, polychromatic optical beam.

In accordance with further aspects of the present invention, the wavelength division multiplexing device can further comprise at least one reflecting element for reflecting the plurality of collimated, monochromatic optical beams toward the diffraction grating, and/or at least one reflecting element for reflecting the reflected, multiplexed, polychromatic optical beam toward the polymer focusing lens.

At this point it should be noted that the above-described improved wavelength division multiplexing device, integrated wavelength division multiplexing device, and wavelength division multiplexing device are all bidirectional devices. Thus, the improved wavelength division multiplexing device can also be an improved wavelength division demultiplexing device, the integrated wavelength division multiplexing device can also be an integrated wavelength division demultiplexing device, and the wavelength division multiplexing device can also be a wavelength division demultiplexing device.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a top view of the wavelength division multiplexing device shown in FIG. 1a.

FIG. 1c is a perspective end view of a portion of the wavelength division multiplexing device shown in FIG. 1a.

FIG. 2a is a perspective view of a coupling device containing a plurality of laser diodes for replacing the plurality of optical input fibers in the multiplexing device shown in FIG. 1a.

FIG. 2b is a perspective view of a coupling device containing a plurality of photodetectors for replacing the plurality of optical input fibers in the demultiplexing device shown in FIG. 3a.

FIG. 3a is a side view of a wavelength division demultiplexing device having a plano-convex polymer collimating/focusing lens and a reflective diffraction grating in accordance with the present invention.

FIG. 3b is a top view of the wavelength division multiplexing device shown in FIG. 3a.

FIG. 4a is a side view of an integrated wavelength division multiplexing device having a plano-convex polymer collimating/focusing lens and a reflective diffraction grating in accordance with the present invention.

FIG. 4b is a top view of the integrated wavelength division multiplexing device shown in FIG. 4a.

FIG. 5a is a side view of an integrated wavelength division multiplexing device having an extended plano-convex polymer collimating/focusing lens and a reflective diffraction grating in accordance with the present invention.

FIG. 5b is a top view of the integrated wavelength division multiplexing device shown in FIG. 5a.

FIG. 6a is a side view of a wavelength division multiplexing device having a convex-plano polymer collimating/focusing lens and a reflective diffraction grating in accordance with the present invention.

FIG. 6b is a top view of the wavelength division multiplexing device shown in FIG. 6a.

FIG. 7a is a side view of an integrated wavelength division multiplexing device having a convex-plano polymer collimating/focusing lens and a reflective diffraction grating in accordance with the present invention.

FIG. 7b is a top view of the integrated wavelength division multiplexing device shown in FIG. 7a.

FIG. 8b is a top view of the integrated wavelength division multiplexing device shown in FIG. 8a.

FIG. 9b is a top view of the wavelength division multiplexing device shown in FIG. 9a.

FIG. 10a is a side view of an integrated wavelength division multiplexing device having a bi-convex polymer collimating/focusing lens and a reflective diffraction grating in accordance with the present invention.

FIG. 10b is a top view of the integrated wavelength division multiplexing device shown in FIG. 10a.

DETAILED DESCRIPTION OF PREFERRED EMBODIMENTS

Figure 1A:
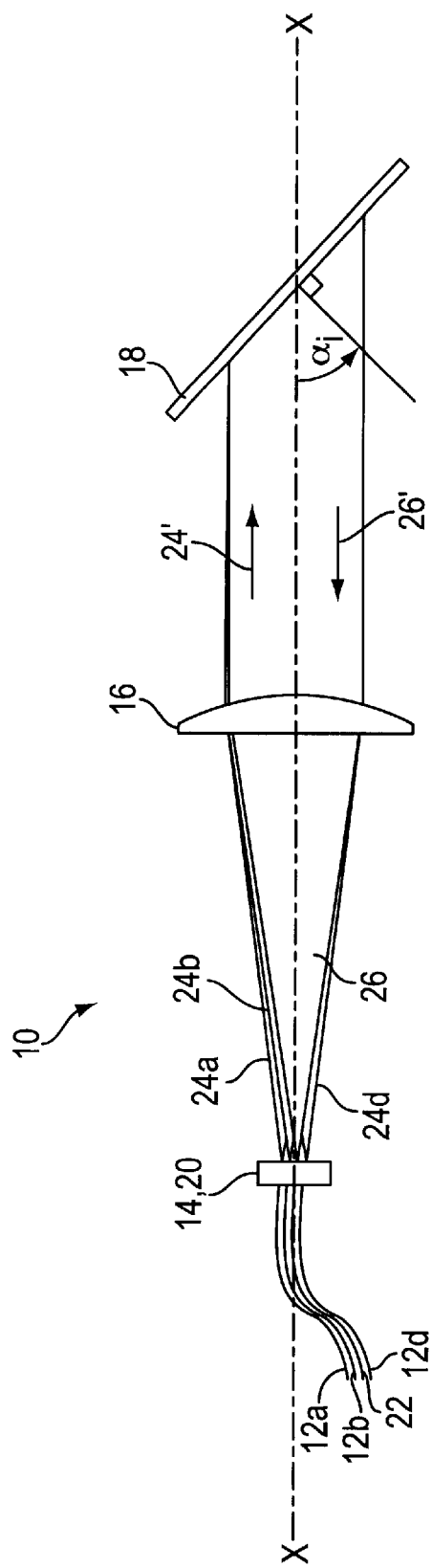
FIG. 1a is a side view of a wavelength division multiplexing device having a plano-convex polymer collimating/focusing lens and a reflective diffraction grating in accordance with the present invention.
Figure 1B:
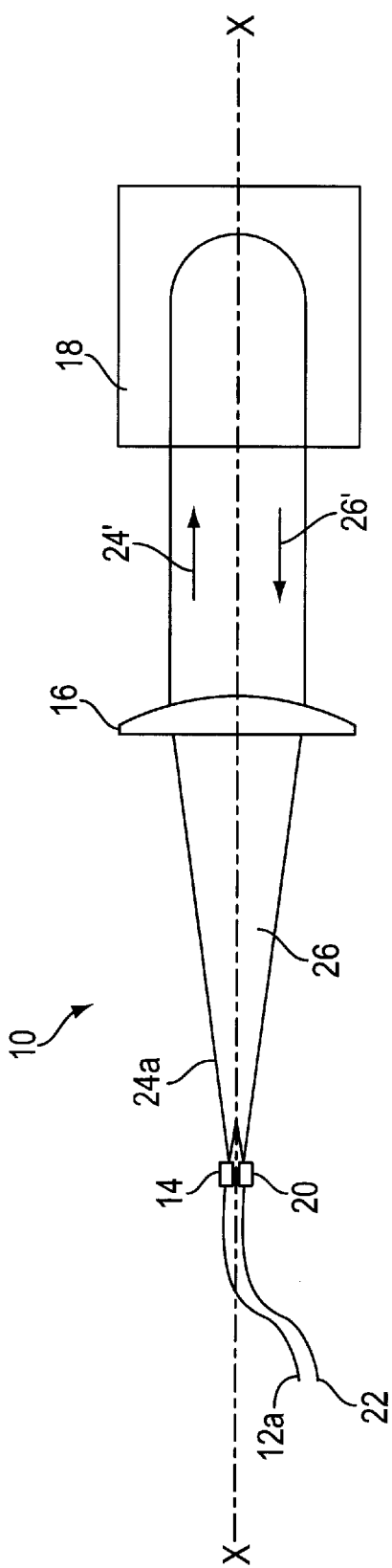

Referring to FIGS. 1a and 1b, there are shown a side view and a top view, respectively, of a preferred embodiment of a wavelength division multiplexing device 10 in accordance with the present invention. The multiplexing device 10 comprises a plurality of optical input fibers 12, an input fiber coupling device 14, a plano-convex polymer collimating/focusing lens 16, a reflective diffraction grating 18, an output fiber coupling device 20, and a single optical output fiber 22. All of the above-identified components of the multiplexing device 10 are disposed along an optical axis X—X of the multiplexing device 10, as will be described in more detail below.

At this point it should be noted that the optical input fibers 12 and the optical output fiber 22, as well as any other optical fibers described herein as being used in conjunction with WDM devices in accordance with the present invention, are single mode optical fibers. Of course, however, this does not limit the present invention WDM devices to use with only single mode optical fibers. For example, the present invention WDM devices can also be used with multimode optical fibers.

It should also be noted that the multiplexing device 10, as well as any other WDM devices described herein as being WDM devices in accordance with the present invention, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Returning to FIGS. 1a and 1b, the plurality of optical input fibers 12 are grouped into a one-dimensional input fiber array (i.e., a 1×4 array) by the input fiber coupling device 14, while the single optical output fiber 22 is secured to the output fiber coupling device 20. Both the input fiber coupling device 14 and the output fiber coupling device 20 are used for purposes of ease of optical fiber handling and precision placement, and can be formed of, for example, a silicon V-groove assembly. Referring to FIG. 1c, there is shown a perspective end view of a portion of the multiplexing device 10 revealing how the plurality of optical input fibers 12 are grouped into the one-dimensional input fiber array by the input fiber coupling device 14, and how the single optical output fiber 22 is secured to the output fiber coupling device 20. FIG. 1c also shows a monochromatic optical input beam 24 being transmitted from each of the plurality of optical input fibers 12, and a single multiplexed, polychromatic optical output beam 26 being transmitted to the single optical output fiber 22.

Each of the monochromatic optical input beams 24 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 24 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 24 are appropriately preselected such that the data channels do not interfere with each other (i.e., there is sufficient channel spacing), and the optical transmission losses through both the optical input fibers 12 and the optical output fiber 22 are low, as is also well known in the art.

The single multiplexed, polychromatic optical output beam 26 being transmitted to the single optical output fiber 22 is carrying a plurality of channels of data at the unique wavelengths of each of the plurality of monochromatic optical input beams 24. The plurality of monochromatic optical input beams 24 are combined into the single multiplexed, polychromatic optical output beam 26 through the combined operation of the plano-convex polymer collimating/focusing lens 16 and the reflective diffraction grating 18, as will be described in more detail below.

At this point it should be noted that the input fiber coupling device 14 and the output fiber coupling device 20 are disposed offset from, but symmetrically about, the optical axis X—X of the multiplexing device 10 so as to insure that the single multiplexed, polychromatic optical output beam 26 is directed to the single optical output fiber 22 secured to the output fiber coupling device 20, and not to any of the plurality of optical input fibers 12 secured to the input fiber coupling device 14, or anywhere else. This offset spacing of the input fiber coupling device 14 and the output fiber coupling device 20 is determined based upon the focusing power of the plano-convex polymer collimating/focusing lens 16, as well as the characteristics of the diffraction grating 18 and the wavelengths of each of the monochromatic optical input beams 24.

Referring again to FIGS. 1a and 1b, each of the plurality of monochromatic optical input beams 24 are transmitted from their corresponding optical input fiber 12 into the air space between the input fiber coupling device 14 and the plano-convex polymer collimating/focusing lens 16. Within this air space, the plurality of monochromatic optical input beams 24 are expanded in diameter until they become incident upon the plano-convex polymer collimating/focusing lens 16. The plano-convex polymer collimating/focusing lens 16 collimates each of the plurality of monochromatic optical input beams 24, and then transmits each collimated, monochromatic optical input beam 24' to the reflective diffraction grating 18.

At this point it should be noted that the optical axis of the plano-convex polymer collimating/focusing lens 16 coincides with the optical axis X—X of the multiplexing device 10 so as to insure that the single multiplexed, polychromatic optical output beam 26 is directed to the single optical output fiber 22 secured to the output fiber coupling device 20, and not to any of the plurality of optical input fibers 12 secured to the input fiber coupling device 14, or anywhere else, as will be described in more detail below.

The reflective diffraction grating 18 operates to angularly disperse the plurality of collimated, monochromatic optical input beams 24' by an amount that is dependent upon the wavelength of each of the plurality of collimated, monochromatic optical input beams 24'. Further, the reflective diffraction grating 18 is oriented at a special angle (i.e., the Littrow diffraction angle, $\alpha_i$) relative to the optical axis X—X of the multiplexing device 10 in order to obtain the Littrow diffraction condition for an optical beam having a wavelength that lies within or near the wavelength range of the plurality of collimated, monochromatic optical input beams 24'. The Littrow diffraction condition requires that an optical beam be incident on and reflected back from a reflective diffraction grating at the exact same angle. Therefore, it will be readily apparent to one skilled in the art that the reflective diffraction grating 18 is used to obtain near-Littrow diffraction for each of the plurality of collimated, monochromatic optical input beams 24'.

The Littrow diffraction angle, $\alpha_i$, is determined by the well-known diffraction grating equation, $$m\lambda = 2d(\sin \alpha_i)$$

wherein m is the diffraction order, $\lambda$ is the wavelength, d is the diffraction grating groove spacing, and $\alpha_i$ is the common angle of incidence and reflection. It will be readily apparent to one skilled in the art that the Littrow diffraction angle, $\alpha_i$, depends upon numerous variables, which may be varied as necessary to optimize the performance of the multiplexing device 10. For example, variables affecting the Littrow diffraction angle, $\alpha_i$, include the desired grating diffraction order, the grating blaze angle, the number of data channels, the spacing of the data channels, and the wavelength range of the multiplexing device 10.

At this point it should be noted that the reflective diffraction grating 18 can be formed from a variety of materials and by a variety of techniques. For example, the reflective diffraction grating 18 can be formed by a three-dimensional hologram in a polymer medium, or by replicating a mechanically ruled master with a polymer material. In both cases, the polymer is overcoated with a thin, highly reflective metal layer such as, for example, gold or aluminum. Alternatively, the reflective diffraction grating 18 can be formed by chemically etching into a planar material such as, for example, glass or silicon, which is also overcoated with a thin, highly reflective metal layer such as, for example, gold or aluminum.

As previously mentioned, the reflective diffraction grating 18 operates to angularly disperse the plurality of collimated, monochromatic optical input beams 24'. Thus, the reflective diffraction grating 18 removes the angular separation of the plurality of collimated, monochromatic optical input beams 24', and reflects a single collimated, polychromatic optical output beam 26' back towards the plano-convex polymer collimating/focusing lens 16. The single collimated, polychromatic optical output beam 26' contains each of the unique wavelengths of the plurality of collimated, monochromatic optical input beams 24'. Thus, the single collimated, polychromatic optical output beam 26' is a single collimated, multiplexed, polychromatic optical output beam 26'. The plano-convex polymer collimating/focusing lens 16 focuses the single collimated, multiplexed, polychromatic optical output beam 26', and then transmits the resulting single multiplexed, polychromatic optical output beam 26 to the output fiber coupling device 20 where it becomes incident upon the single optical output fiber 22. The single multiplexed, polychromatic optical output beam 26 is then coupled into the single optical output fiber 22 for transmission therethrough.

At this point it should again be noted that the input fiber coupling device 14 and the output fiber coupling device 20 are disposed offset from, but symmetrically about, the optical axis X—X of the multiplexing device 10 so as to insure that the single multiplexed, polychromatic optical output beam 26 is directed to the single optical output fiber 22 secured to the output fiber coupling device 20. However, in addition to this offset spacing of the input fiber coupling device 14 and the output fiber coupling device 20, the single multiplexed, polychromatic optical output beam 26 is also insured of being directed to the single optical output fiber 22 in a very efficient manner (i.e., with very low insertion losses and negligible channel crosstalk) by virtue of the precise imaging of both the input optical beams 24 and the output optical beam 26 within the multiplexing device 10 through the use of the plano-convex polymer collimating/focusing lens 16. This precise imaging of both the input optical beams 24 and the output optical beam 26 within the multiplexing device 10 is achieved at a very low cost due to the very low cost of the plano-convex polymer collimating/focusing lens 16. That is, in comparison to the cost of lenses formed of standard optical glass materials, the cost of lenses formed of polymer materials is far less expensive. For example, the typical cost of a lens formed of a standard optical glass material such as, for example, BK7, is approximately $25.00, while the typical cost of a lens formed of a polymer material such as, for example, acrylic polymer, is approximately $1.00. The reason for this large disparity in cost stems largely from differences in methods of fabrication. For example, while standard optical glass lenses must be fabricated using timely grinding and polishing processes, polymer lenses can be fabricated via quick injection or compression molding processes, which are easily repeatable and can be performed on a very large scale. Another factor which contributes to the large disparity in cost between standard optical glass lenses and polymer lenses is the difference in material costs. For example, the cost of a typical standard optical glass material such as, for example, BK7, is approximately $15.00/lb, while the cost of a typical monomer material such as, for example, acrylic monomer, which is typically used to form acrylic polymer, is approximately $0.50/lb.

At this point it should be noted that polymer lenses, as with all polymer products, are typically formed through the polymerization of one or more monomers. That is, the polymer materials of which the plano-convex polymer collimating/focusing lens 16 is formed are themselves typically formed through the polymerization of one or more monomers. Examples of polymer materials of which the plano-convex polymer collimating/focusing lens 16 can be formed include acrylic polymer (monomer manufactured by BASF Corporation with a polymer refractive index n=1.481 @ 1550 nm), styrene polymer (monomer manufactured by Arco Chemical Company with a polymer refractive index n=1.568 @ 1550 nm), polycarbonate polymer (monomer manufactured by Akzo Nobel with a polymer refractive index n=1.562 @ 1550 nm), copolymers thereof, and any of a number of other appropriate polymer materials that efficiently transmit optical beams in the infrared (IR) region of the electromagnetic spectrum, since this is the region where the power loss (attenuation) and dispersion of silica-based optical fibers is very low. In fact, most WDM devices are used in the window of 1530–1610 nm, which is the range over which erbium-doped fiber amplifiers (EDFAs) operate and optical fibers have low loss. This 1530–1610 nm region is often called the "third window" for optical fibers. Similarly, however, some WDM devices are also used in the so-called "second window" for optical fibers (i.e., typically within the window of 1300–1330 nm) where optical fibers have very low dispersion and low loss. Consequently, most prior art WDM devices use standard optical glasses that transmit efficiently in these IR regions. For example, standard optical glasses such as FK3 (manufactured by Schott Glass Technologies, Inc. with n=1.450 @ 1550 nm), BK7 (manufactured by Schott Glass Technologies, Inc. with n=1.501 @ 1550 nm), K5 (manufactured by Schott Glass Technologies, Inc. with n=1.506 @ 1550 nm), and Gradium have optical transmission efficiencies of 97–99% for one-inch material thicknesses in these IR regions. This level of transmission efficiency is generally adequate, but, as previously mentioned, there are cost considerations associated with the use of these materials for lenses in WDM devices (i.e., increased component costs for WDM devices requiring multiple lenses formed of standard optical glass materials, and increased fabrication costs for gradient refractive index lenses).

At this point it should be noted that although the multiplexing device 10 is shown using the plano-convex polymer collimating/focusing lens 16, it is also within the scope of the present invention to use lenses having more than one curved surface and higher number lens configurations. That is, although the collimating/focusing power of only one curved surface on the plano-convex polymer collimating/focusing lens 16 is sufficient to provide essentially diffraction-limited collimating/focusing in the multiplexing device 10, the collimating/focusing lens 16 is not precluded from being a bi-convex polymer collimating/focusing singlet, doublet, or even higher number lens configuration. In fact, if the collimating/focusing lens 16 is a bi-convex polymer collimating/focusing singlet, doublet, or even higher number lens configuration, the imaging of both the input optical beams 24 and output optical beam 26 within the multiplexing device 10 can be substantially improved, as will be discussed in more detail below. It should also be noted that diffractive optic polymer lenses can also be used.

At this point it should be noted that the plano-convex polymer collimating/focusing lens 16, as well as any other polymer collimating/focusing lens described herein as being used in WDM devices in accordance with the present invention, may be spherical or aspherical in shape. Although spherical lenses are more common than aspherical lenses, mainly due to the fact that they are easier to manufacture when using standard optical glass materials, the performance of a WDM device may be improved by using an aspherical polymer collimating/focusing lens instead of a spherical polymer collimating/focusing lens. That is, the curvature at the edges of an aspherical polymer collimating/focusing lens is less steep than the curvature at the edges of a spherical polymer collimating/focusing lens, thereby resulting in reductions in the level of spherical aberrations in a WDM device incorporating such an aspherical polymer collimating/focusing lens. A benefit of using polymer materials for the collimating/focusing lenses is that a polymer aspherical lens is equally as easy to fabricate as a polymer spherical lens, and, in correspondence with what was previously mentioned regarding the comparative costs of fabricating standard optical glass lenses and polymer lenses, both polymer spherical lenses and polymer aspherical lenses are easier and cheaper to fabricate than any type of standard optical glass lenses.

At this point it should be noted that the plano-convex polymer collimating/focusing lens 16, as well as any other polymer collimating/focusing lens described herein as being used in WDM devices in accordance with the present invention, is typically coated with an anti-reflection material to prevent losses due to surface reflections. Another benefit of using polymer materials for the collimating/focusing lens 16 is that, in contrast to standard optical glass lenses which are typically coated under high heat and high vacuum, polymer lenses are typically coated under lower temperature and lower vacuum.

At this point it should be noted that the plurality of optical input fibers 12 could be replaced in the multiplexing device 10 by a corresponding plurality of laser diodes 28 secured within a coupling device 30, such as shown in FIG. 2a. The coupling device 30 performs a similar function to the input fiber coupling device 14, that being to precisely group the plurality of laser diodes 28 into a one-dimensional input array. The plurality of laser diodes 28 are used in place of the plurality of optical input fibers 12 to transmit the plurality of monochromatic optical input beams 24 to the multiplexing device 10. The array of laser diodes 28 may operate alone, or may be used with appropriate focusing lenses to provide the best coupling and the lowest amount of signal loss and channel crosstalk.

At this point it should be noted that the multiplexing device 10, as well as all of the multiplexing devices described herein, may be operated in a converse configuration as a demultiplexing device 40, such as shown in FIGS. 3a and 3b. The demultiplexing device 40 is physically identical to the multiplexing device 10, and is therefore numerically identified as such. However, the demultiplexing device 40 is functionally opposite to the multiplexing device 10. That is, a single multiplexed, polychromatic optical input beam 42 is transmitted from the single optical fiber 22, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. The single multiplexed, polychromatic optical input beam 42 is separated into the plurality of monochromatic optical output beams 44 through the combined operation of the plano-convex polymer collimating/focusing lens 16 and the reflective diffraction grating 18. Thus, the plano-convex polymer collimating/focusing lens 16 and the reflective diffraction grating 18 operate to perform a demultiplexing function.

At this point it should be noted that the plurality of optical fibers 12 could be replaced in the demultiplexing device 40 by a corresponding plurality of photodetectors 48 secured within a coupling device 50, such as shown in FIG. 2b. The coupling device 50 performs a similar function to the fiber coupling device 14, that being to precisely group the plurality of photodetectors 48 into a one-dimensional input array. The plurality of photodetectors 48 are used in place of the plurality of optical fibers 12 to receive the plurality of monochromatic optical output beams 44 from the demultiplexing device 40. The array of photodetectors 48 may operate alone, or may be used with appropriate focusing lenses to provide the best coupling and the lowest amount of signal loss and channel crosstalk.

Referring to FIGS. 4a and 4b, there are shown a side view and a top view, respectively, of an alternate embodiment of a wavelength division multiplexing device 60 in accordance with the present invention. The multiplexing device 60 is physically identical to the multiplexing device 10, except for the addition of a first boot lens 62 between the fiber coupling devices 14, 20 and the plano-convex polymer collimating/focusing lens 16, and a second boot lens 64 between the plano-convex polymer collimating/focusing lens 16 and the reflective diffraction grating 18.

The first boot lens 62 and the second boot lens 64 may be formed of a variety of types of materials including, but not limited to, glass, polymer, and crystalline materials. It should be noted, however, that it is preferable to have as large a difference as possible between the index of refraction value of the plano-convex polymer collimating/focusing lens 16 and the index of refraction value of the material directly adjacent to the plano-convex polymer collimating/focusing lens 16. This large difference between the index of refraction value of the plano-convex polymer collimating/focusing lens 16 and the index of refraction value of the material directly adjacent to the plano-convex polymer collimating/focusing lens 16 allows for the highly efficient collimation and focusing of the input optical beams 24 and output optical beam 26, respectively, by the plano-convex polymer collimating/focusing lens 16, while simultaneously minimizing the amount of wavelength distortion that is introduced into the optical system of the multiplexing device 60 by this lens 16. Thus, for example, if the plano-convex polymer collimating/focusing lens 16 has a relatively high index of refraction value, then it is preferable that the first boot lens 62 and the second boot lens 64 have relatively low index of refraction values. In one particular example, the plano-convex polymer collimating/focusing lens 16 could be formed of acrylic polymer (monomer manufactured by BASF Corporation with a polymer refractive index n=1.481 @ 1550 nm), and the first boot lens 62 and the second boot lens 64 could be formed of fused silica (manufactured by Schott Glass Technologies, Inc. with n=1.444 @ 1550 nm).

The first boot lens 62 has a planar front surface 62a for mating with the fiber coupling devices 14 and 20 and the associated secured optical fibers 12 and 22, respectively. The fiber coupling devices 14 and 20 and the secured optical fibers 12 and 22 may be either abutted against the planar front surface 62a or affixed to the planar front surface 62a using optical cement or some other optically transparent bonding technique, depending upon system mobility requirements and optical beam alignment and loss considerations.

The first boot lens 62 also has a planar back surface 62b for mating with a planar front surface 16a of the plano-convex polymer collimating/focusing lens 16. The planar back surface 62b of the first boot lens 62 is typically joined or affixed to the planar front surface 16a of the plano-convex polymer collimating/focusing lens 16 using optical cement or some other optically transparent bonding technique.

The second boot lens 64 has a concave front surface 64a for mating with a convex back surface 16b of the plano-convex polymer collimating/focusing lens 16. The concave front surface 64a of the second boot lens 64 is typically joined or affixed to the convex back surface 16b of the plano-convex polymer collimating/focusing lens 16 using optical cement or some other optically transparent bonding technique.

The second boot lens 64 also has a planar back surface 64b that is angled similar to the reflective diffraction grating 18 at the Littrow diffraction angle, $\alpha_i$, relative to the optical axis X—X of the multiplexing device 60. As with the multiplexing device 10, the reflective diffraction grating 18 can be formed using a separate material, and this material can then be joined or affixed to the planar back surface 64b of the second boot lens 64 using optical cement or some other optically transparent bonding technique. Alternatively, the reflective diffraction grating 18 can be formed directly on the planar back surface 64b of the second boot lens 64, thereby avoiding the joining or affixing of the reflective diffraction grating 18 to the planar back surface 64b of the second boot lens 64. In either case, the reflective diffraction grating 18 and the second boot lens 64 are integrated along with the plano-convex polymer collimating/focusing lens 16 and the first boot lens 62 to form a compact, rigid, and environmentally and thermally stable multiplexing device 60. The integrated nature of this multiplexing device 60 is particularly useful for maintaining component alignment, which provides long-term performance in contrast to some non-integrated air-spaced devices that characteristically degrade in alignment and therefore performance over time.

The multiplexing device 60 is functionally identical to the multiplexing device 10, except for a slight decrease in optical beam transmission efficiency due to the addition of the first and second boot lenses 62 and 64, respectively. However, even with this slight decrease in optical beam transmission efficiency, the optical performance of the multiplexing device 60 is still exceptional due to the precise imaging of both the input optical beams 24 and the output optical beam 26 within the multiplexing device 50 through the use of the plano-convex polymer collimating/focusing lens 16.

Referring to FIGS. 5a and 5b, there are shown a side view and a top view, respectively, of an alternate embodiment of a wavelength division multiplexing device 70 in accordance with the present invention. The multiplexing device 70 is physically identical to the multiplexing device 60, except that the first boot lens 62 has been removed and the planar front surface 16'a of the plano-convex polymer collimating/focusing lens 16' has been extended so as to allow the fiber coupling devices 14, 20 and the secured optical fibers 12 and 22, respectively, to be either abutted against the planar front surface 16'a or affixed to the planar front surface 16'a using optical cement or some other optically transparent bonding technique, depending upon system mobility requirements and optical beam alignment and loss considerations. Similar to the multiplexing device 60, the integrated nature of the multiplexing device 70 is particularly useful for maintaining component alignment, which provides long-term performance in contrast to some non-integrated air-spaced devices that characteristically degrade in alignment and therefore performance over time. The multiplexing device 70 is functionally identical to the multiplexing device 60, except for a slight increase in optical beam transmission efficiency due to the removal of the first boot lens 62.

At this point it should be noted that the plano-convex polymer collimating/focusing lens 16, as shown in the multiplexing device 10 of FIGS. 1a and 1b, may be replaced by a convex-plano polymer collimating/focusing lens 17 to form an alternate embodiment of a wavelength division multiplexing device 80 in accordance with the present invention as shown in FIGS. 6a and 6b. The multiplexing device 80 of FIGS. 6a and 6b realizes the above-described benefits of using a polymer material to form the plano-convex polymer collimating/focusing lens 16 in the multiplexing device 10 of FIGS. 1a and 1b. That is, the above-described benefits of using a polymer material to form the plano-convex polymer collimating/focusing lens 16 in multiplexing device 10 of FIGS. 1a and 1b are also realized when using a polymer material to form the convex-plano polymer collimating/focusing lens 17 in multiplexing device 80 of FIGS. 6a and 6b. The multiplexing device 80 is functionally identical to the multiplexing device 10.

At this point it should be noted, similar to the multiplexing device 60 of FIGS. 4a and 4b, boot lenses can be added to the multiplexing device 80 of FIGS. 6a and 6b to form an alternate embodiment of a wavelength division multiplexing device 90 in accordance with the present invention as shown in FIGS. 7a and 7b. The multiplexing device 90 of FIGS. 7a and 7b realizes the above-described benefits of using boot lenses in the multiplexing device 60 of FIGS. 4a and 4b. That is, the above-described benefits of using the first boot lens 62 and the second boot lens 64 in multiplexing device 60 of FIGS. 4a and 4b are also realized when using a first boot lens 63 and a second boot lens 65 in multiplexing device 90 of FIGS. 7a and 7b. Similar to the multiplexing device 60, the integrated nature of the multiplexing device 90 is particularly useful for maintaining component alignment, which provides long-term performance in contrast to some non-integrated air-spaced devices that characteristically degrade in alignment and therefore performance over time. The multiplexing device 90 is functionally identical to the multiplexing device 60.

Figure 8A:
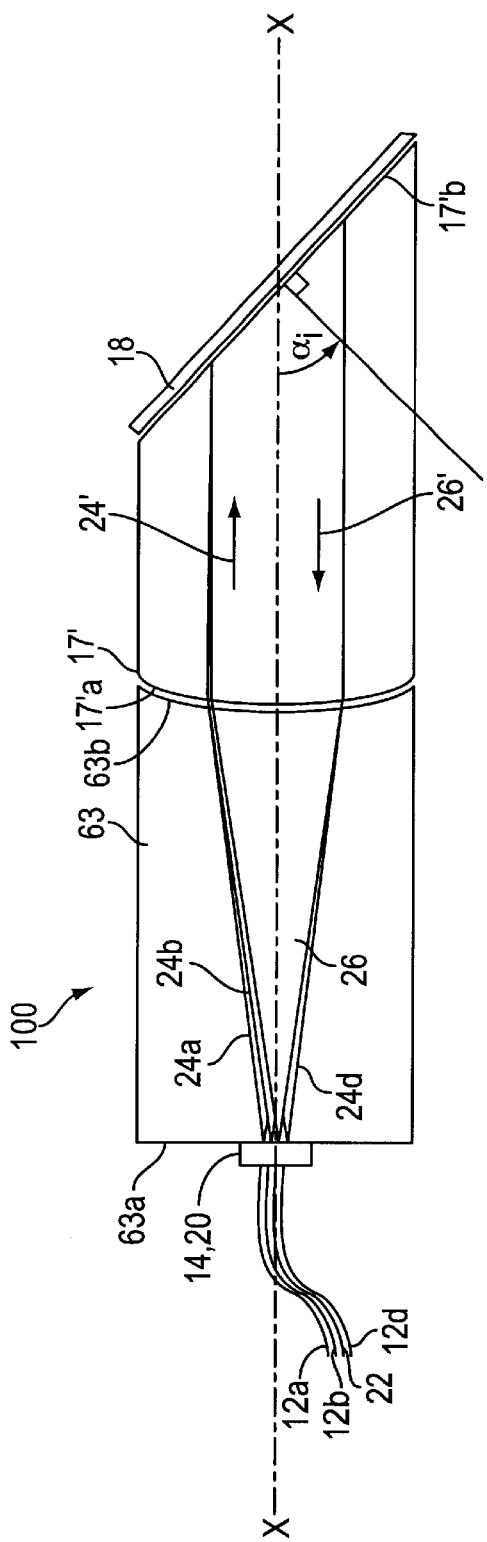
FIG. 8a is a side view of an integrated wavelength division multiplexing device having an extended convex-plano polymer collimating/focusing lens and a reflective diffraction grating in accordance with the present invention.
Figure 8B:
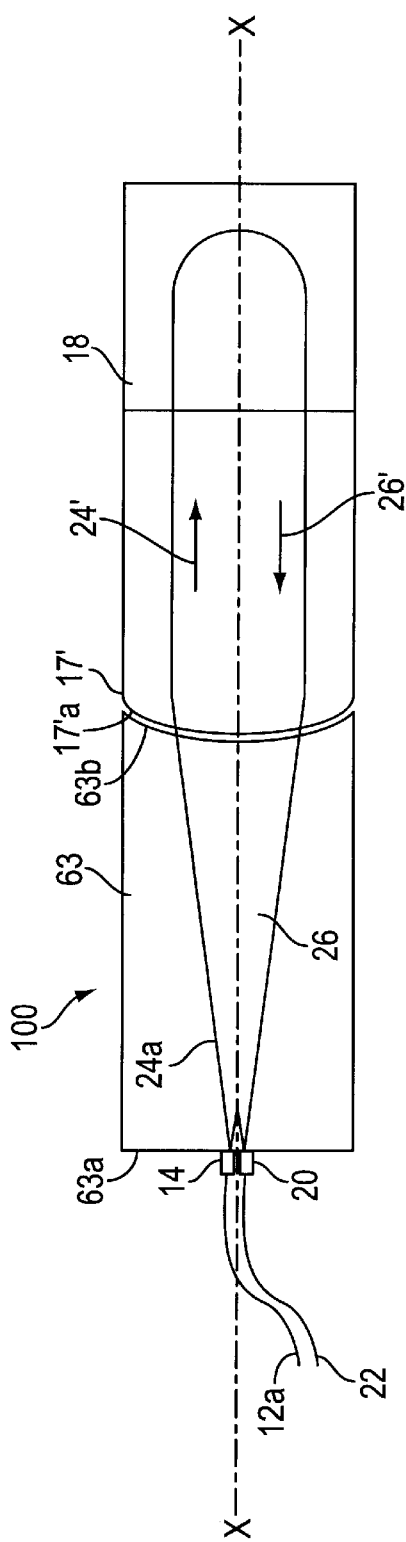

At this point it should be noted that the second boot lens 65 can be removed from the multiplexing device 90 of FIGS. 7a and 7b, and the back surface 17'b of the convex-plano polymer collimating/focusing lens 17' can be extended out to the reflective diffraction grating 18 to form an alternate embodiment of a wavelength division multiplexing device 100 in accordance with the present invention as shown in FIGS. 8a and 8b. The back surface 17'b of the convex-plano polymer collimating/focusing lens 17' is angled similar to the reflective diffraction grating 18 at the Littrow diffraction angle, $\alpha_i$, relative to the optical axis X—X of the multiplexing device 100. As with all of the previously described embodiments, the reflective diffraction grating 18 can be formed using a separate material, and this material can then be joined or affixed to the planar back surface 17'b of the convex-plano polymer collimating/focusing lens 17' using optical cement or some other optically transparent bonding technique. Alternatively, the reflective diffraction grating 18 can be formed directly on the planar back surface 17'b of the convex-plano polymer collimating/focusing lens 17', thereby avoiding the joining or affixing of the reflective diffraction grating 18 to the planar back surface 17'b of the convex-plano polymer collimating/focusing lens 17'. In either case, the reflective diffraction grating 18 and the convex-plano polymer collimating/focusing lens 17' are integrated along with the first homogeneous index boot lens 63 to form a compact, rigid, and environmentally and thermally stable multiplexing device 100. Similar to the multiplexing device 70, the integrated nature of the multiplexing device 100 is particularly useful for maintaining component alignment, which provides long-term performance in contrast to some non-integrated air-spaced devices that characteristically degrade in alignment and therefore performance over time. The multiplexing device 100 is functionally identical to the multiplexing device 70.

At this point it should be noted that either the first boot lens 62 or the second boot lens 64 may be removed from the multiplexing device 60, the second boot lens 64 may be removed from the multiplexing device 70, either the first boot lens 63 or the second boot lens 65 may be removed from the multiplexing device 90, and the first boot lens 63 may be removed from the multiplexing device 100, in order to create additional alternate embodiments (not shown) while still retaining the above-described benefits of using a polymer material to form the plano-convex polymer collimating/focusing lens 16 or the convex-plano polymer collimating/focusing lens 17.

Figure 9A:
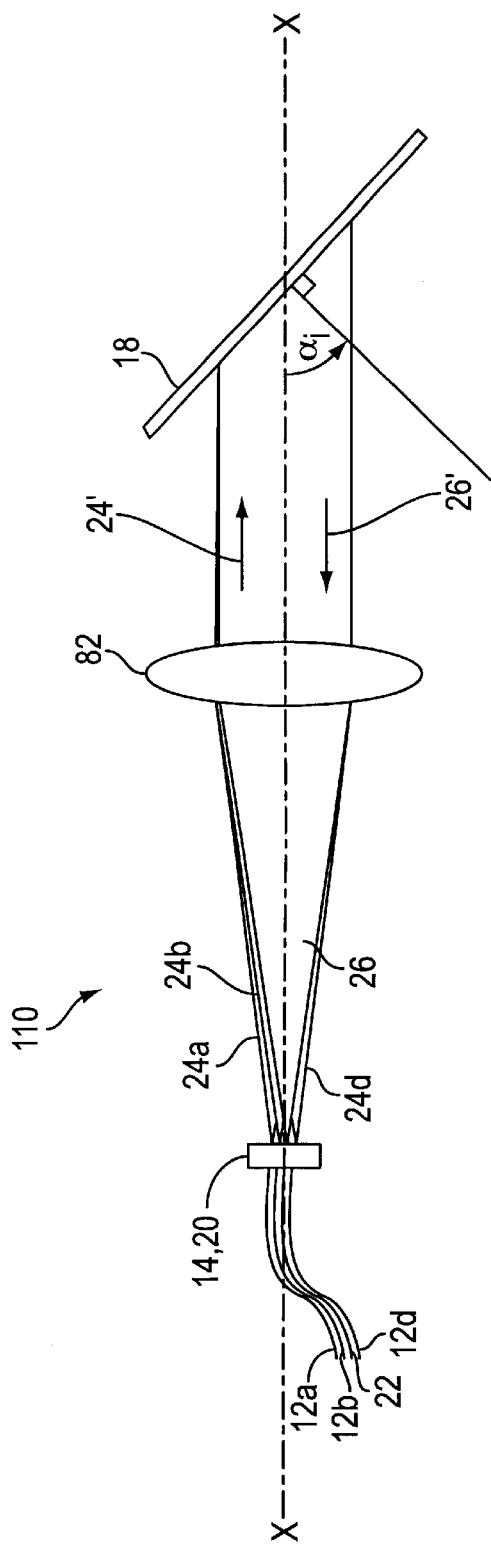
FIG. 9a is a side view of a wavelength division multiplexing device having a bi-convex polymer collimating/focusing lens and a reflective diffraction grating in accordance with the present invention.
Figure 9B:
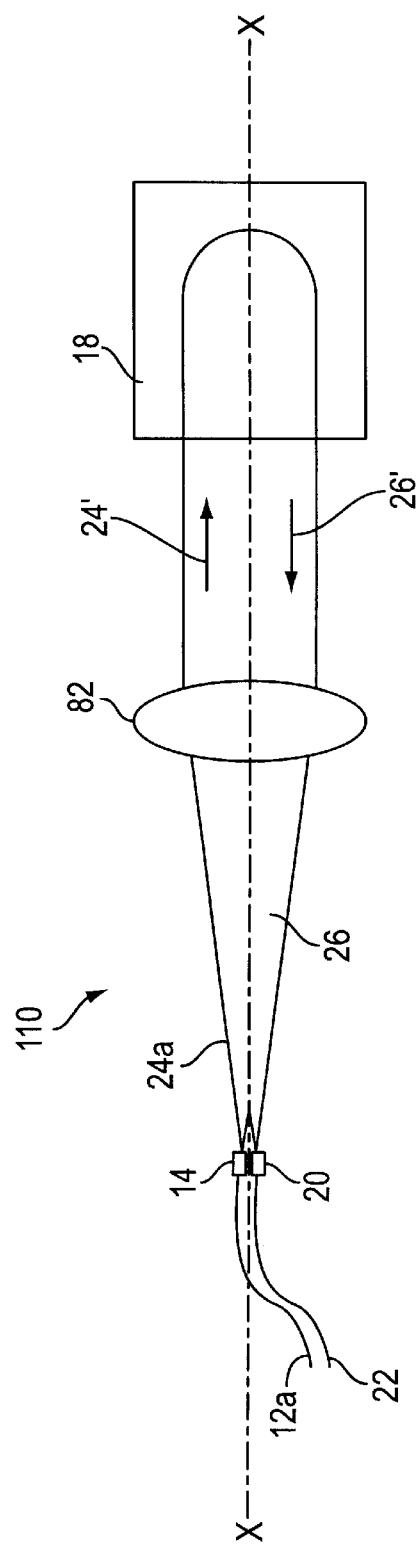

Referring to FIGS. 9a and 9b, there are shown a side view and a top view, respectively, of an alternate embodiment of a wavelength division multiplexing device 110 in accordance with the present invention. The multiplexing device 110 is physically identical to the multiplexing device 10, except that the plano-convex polymer collimating/focusing lens 16 has been replaced by a bi-convex polymer collimating/focusing lens 82 so as to enhance the imaging of both the input optical beams 24 and output optical beam 26 within the multiplexing device 110. That is, the additional curved surface of the bi-convex polymer collimating/focusing lens 82 provides additional imaging capability, thereby increasing the fiber coupling efficiency (FCE) of the multiplexing device 110. In contrast to a measure of insertion loss, the FCE of a WDM device expresses the efficiency of only the optical system of the WDM device for each data channel, without taking into account the efficiency of the diffraction grating. Comparatively, the use of the bi-convex polymer collimating/focusing lens 82 instead of the plano-convex polymer collimating/focusing lens 16 typically results in an increase in the FCE of approximately 1% for the configuration of WDM devices shown in FIGS. 1 and 9. Of course, further increases in the FCE can typically be achieved using doublet, triplet, or even higher number lens configurations.

Referring to FIGS. 10a and 10b, there are shown a side view and a top view, respectively, of an alternate embodiment of a wavelength division multiplexing device 120 in accordance with the present invention. The multiplexing device 120 is physically identical to the multiplexing device 60, except that the plano-convex polymer collimating/focusing lens 16 has been replaced by a bi-convex polymer collimating/focusing lens 82, and the first boot lens 62 has been replaced by the first boot lens 63. As with the multiplexing device 110, the replacement of the plano-convex polymer collimating/focusing lens 16 with the bi-convex polymer collimating/focusing lens 82 in the multiplexing device 90 has been done to enhance the imaging of both the input optical beams 24 and output optical beam 26 within the multiplexing device 120. The first boot lens 62 has been replaced with the first boot lens 63 because the first boot lens 63 has a concave back surface 63b for mating with a convex front surface 82a of the bi-convex polymer collimating/focusing lens 82.

At this point it should be noted that, similar to the multiplexing device 60, either the first boot lens 63 or the second boot lens 64 may be removed from the multiplexing device 120 in order to create additional alternate embodiments (not shown) while still retaining the above-described benefits of using a polymer material to form the bi-convex polymer collimating/focusing lens 82.

Figure 11:
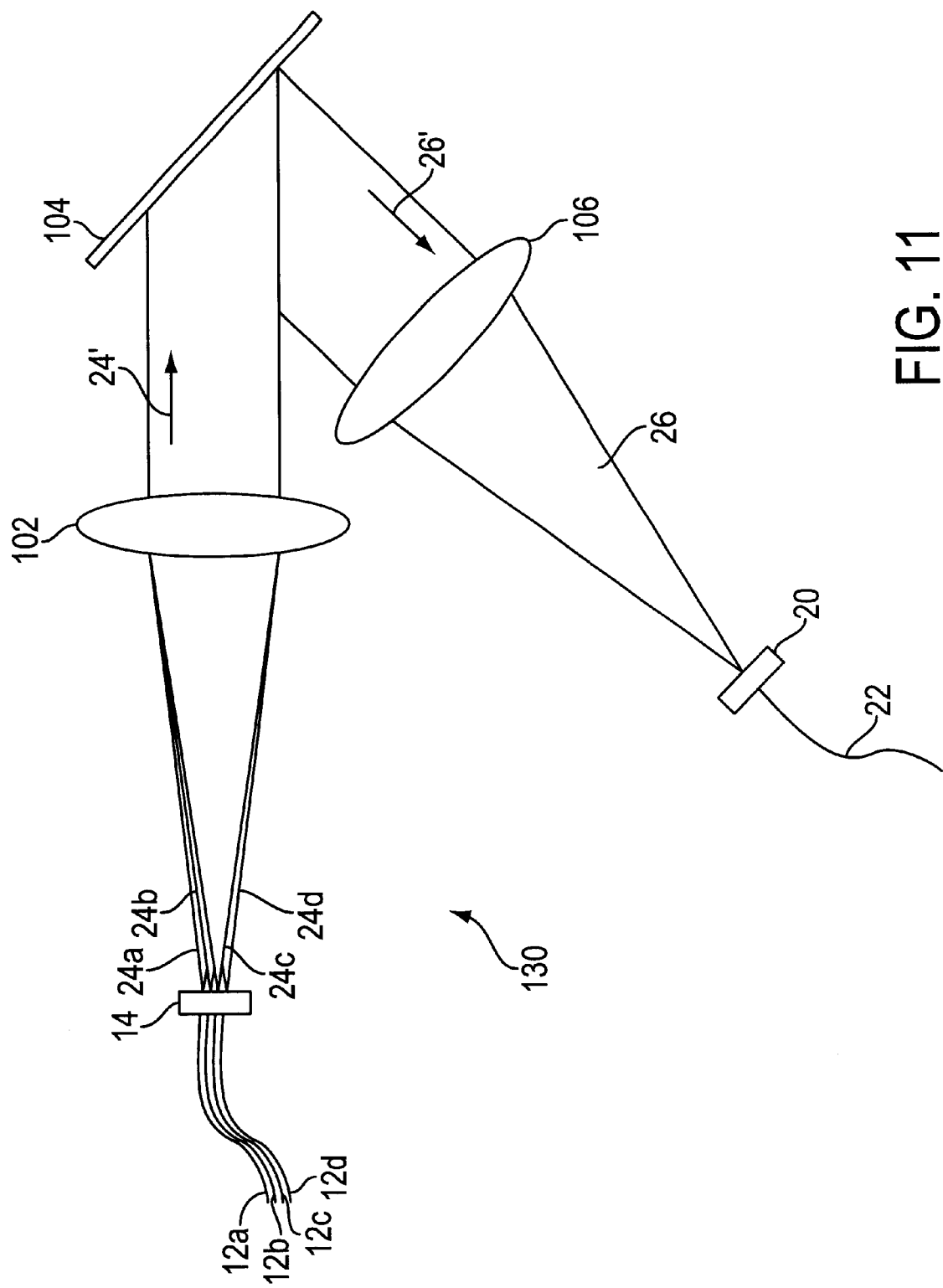
FIG. 11 is a side view of a wavelength division multiplexing device having two bi-convex polymer lenses and a reflective diffraction grating in accordance with the present invention.

Referring to FIG. 11, there is shown a side view of an alternate embodiment of a wavelength division multiplexing device 130 in accordance with the present invention. The multiplexing device 130 differs from the previously described embodiments by using a separate bi-convex polymer collimating lens 102, a separate bi-convex polymer focusing lens 106, and a reflective diffraction grating 104 that is configured to operate at reflecting angle that is different than the reflecting angle of the previously described embodiments. The bi-convex polymer collimating lens 102 collimates the plurality of monochromatic optical input beams 24, and then transmits the plurality of collimated, monochromatic optical input beams 24' to the reflective diffraction grating 104. The reflective diffraction grating 104 removes the angular separation from the plurality of collimated, monochromatic optical input beams 24' and reflects the single collimated, multiplexed, polychromatic optical output beam 26' toward the bi-convex polymer focusing lens 106. The bi-convex polymer focusing lens 106 focuses the single collimated, multiplexed, polychromatic optical output beam 26', and then transmits the resulting single multiplexed, polychromatic optical output beam 26 to the output fiber coupling device 20 where it becomes incident upon the single optical output fiber 22. The single multiplexed, polychromatic optical output beam 26 is then coupled into the single optical output fiber 22 for transmission therethrough.

In accordance with the practices described above, the bi-convex polymer collimating lens 102 and/or the bi-convex polymer focusing lens 106 in the multiplexing device 130 can be replaced with plano-convex polymer collimating/focusing lenses, or with polymer collimating/focusing doublet, triplet, or even higher number lens configurations. Also, boot lenses can be added to the multiplexing device 130 in accordance with the practices described above. The benefits and detriments associated with using these substitute/additional components are applicable to the multiplexing device 130 as would be the case with the embodiments described above. Of course, the most significant benefits come from the use of polymer materials for the lenses. That is, regardless of embodiment, the use of polymer materials for lenses in WDM devices can lead to increased device performance, as well as reduced device cost, complexity, and manufacturing risk. Simply said, the use of polymer lenses allows for the construction of a family of simple, low cost, yet very powerful WDM devices, particularly for use in DWDM (i.e., high channel number) applications.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An integrated wavelength division multiplexing device comprising:

a polymer collimating/focusing lens for collimating a plurality of monochromatic optical beams traveling along a first direction, and for focusing a multiplexed, polychromatic optical beam traveling along a second direction, the second direction being substantially opposite the first direction;

a boot lens affixed to the polymer collimating/focusing lens for transmitting the plurality of monochromatic optical beams from the polymer collimating/focusing lens along the first direction, and for transmitting the multiplexed, polychromatic optical beam to the polymer collimating/focusing lens along the second direction, the boot lens having a planar interface surface; and a diffraction grating formed at the planar interface surface of the boot lens for combining the plurality of monochromatic optical beams into the multiplexed, polychromatic optical beam, and for reflecting the multiplexed, polychromatic optical beam back into the boot lens.

2. The device as defined in claim 1, wherein the boot lens is incorporated into the polymer collimating/focusing lens such that the polymer collimating/focusing lens has the planar interface surface at which the diffraction grating is formed.

3. The device as defined in claim 1, wherein the boot lens is a first boot lens, the device further comprising:

a second boot lens affixed to the polymer collimating/focusing lens for transmitting the plurality of monochromatic optical beams to the polymer collimating/focusing lens along the first direction, and for transmitting the multiplexed, polychromatic optical beam from the polymer collimating/focusing lens along the second direction.

4. The device as defined in claim 3, wherein the second boot lens has a planar interface surface for accepting the plurality of monochromatic optical beams from at least one optical source, and for outputting the multiplexed, polychromatic optical beam to at least one optical receiver.

5. The device as defined in claim 1, wherein the polymer collimating/focusing lens has a planar interface surface for accepting the plurality of monochromatic optical beams from at least one optical source, and for outputting the multiplexed, polychromatic optical beam to at least one optical receiver.

6. The device as defined in claim 1, wherein the diffraction grating is a reflective diffraction grating oriented at the Littrow diffraction angle with respect to the first and second directions.

7. An integrated wavelength division demultiplexing device comprising:

a polymer collimating/focusing lens for collimating a multiplexed, polychromatic optical beam traveling along a first direction, and for focusing a plurality of monochromatic optical beams traveling along a second direction, the second direction being substantially opposite the first direction;

a boot lens affixed to the polymer collimating/focusing lens for transmitting the multiplexed, polychromatic optical beam from the polymer collimating/focusing lens along the first direction, and for transmitting the plurality of monochromatic optical beams to the polymer collimating/focusing lens along the second direction, the boot lens having a planar interface surface; and a diffraction grating formed at the planar interface surface of the boot lens for separating the multiplexed, polychromatic optical beam into the plurality of monochromatic optical beams, and for reflecting the plurality of monochromatic optical beams back into the boot lens.

8. The device as defined in claim 7, wherein the boot lens is incorporated into the polymer collimating/focusing lens such that the polymer collimating/focusing lens has the planar interface surface at which the diffraction grating is formed.

9. The device as defined in claim 7, wherein the boot lens is a first boot lens, the device further comprising:

a second boot lens affixed to the polymer collimating/focusing lens for transmitting the multiplexed, polychromatic optical beam to the polymer collimating/focusing lens along the first direction, and for transmitting the plurality of monochromatic optical beams from the polymer collimating/focusing lens along the second direction.

10. The device as defined in claim 9, wherein the second boot lens has a planar interface surface for accepting the multiplexed, polychromatic optical beam from an optical source, and for outputting the plurality of monochromatic optical beams to at least one optical receiver.

11. The device as defined in claim 7, wherein the polymer collimating/focusing lens has a planar interface surface for accepting the multiplexed, polychromatic optical beam from an optical source, and for outputting the plurality of monochromatic optical beams to at least one optical receiver.

12. The device as defined in claim 7, wherein the diffraction grating is a reflective diffraction grating oriented at the Littrow diffraction angle with respect to the first and second directions.

* * * * *